(12) United States Patent
Thiebeauld De La Crouee et al.

(10) Patent No.: US 8,788,847 B2
(45) Date of Patent: Jul. 22, 2014

(54) SECURE DATA PROCESSING METHOD AND ASSOCIATED DEVICE

(75) Inventors: Hugues Thiebeauld De La Crouee, Bordeaux (FR); Christophe Giraud, Pessac (FR)

(73) Assignee: Oberthur Technologies, Colombes (FR)

( * ) Notice: Subject to any disclaimer, the term of this patent is extended or adjusted under 35 U.S.C. 154(b) by 952 days.

(21) Appl. No.: 11/578,670

(22) PCT Filed: Apr. 14, 2005

(86) PCT No.: PCT/FR2005/000905
§ 371 (c)(1), (2), (4) Date: Dec. 18, 2006

(87) PCT Pub. No.: WO2005/109742
PCT Pub. Date: Nov. 17, 2005

(65) Prior Publication Data
US 2009/0254761 A1    Oct. 8, 2009

(30) Foreign Application Priority Data

Apr. 21, 2004  (FR) ...................................... 04 04225
May 5, 2004  (FR) ...................................... 04 04824

(51) Int. Cl.
| H04L 9/00 | (2006.01) |
| G06F 21/00 | (2013.01) |
| G06F 21/51 | (2013.01) |
| G06F 21/77 | (2013.01) |
| G06F 21/64 | (2013.01) |

(52) U.S. Cl.
CPC ................ *G06F 21/51* (2013.01); *G06F 21/77* (2013.01); *G06F 21/64* (2013.01)
USPC .......................................... 713/193; 713/194

(58) Field of Classification Search
None
See application file for complete search history.

(56) References Cited

U.S. PATENT DOCUMENTS

| 6,067,621 | A | * | 5/2000 | Yu et al. ......................... 713/172 |
| 6,188,635 | B1 | * | 2/2001 | Hashimoto et al. ...... 365/230.08 |
| 6,327,661 | B1 | * | 12/2001 | Kocher et al. .................. 713/193 |
| 6,735,696 | B1 | * | 5/2004 | Hannah .......................... 713/189 |
| 6,891,952 | B1 | * | 5/2005 | Puehlhoefer et al. .......... 380/262 |
| 2006/0156005 | A1 | | 7/2006 | Fischer et al. |
| 2006/0242700 | A1 | | 10/2006 | Fischer et al. |

FOREIGN PATENT DOCUMENTS

WO    WO 00/10283    2/2000

OTHER PUBLICATIONS

David Flanagan: "Example From Java Examples in a Nutshell", Internet Article, 'Online!, Nov. 22, 2001, XP002303173 Retrieved From the Internet.
Helmut Scherzer. "Smartcard Operating Systes—Potential Risks and Security Countermeasures", Internet Article, 'Online!, Jan. 31, 2003 XP002303174, Retrieved From the Internet.

(Continued)

*Primary Examiner* — Gilberto Barron, Jr.
*Assistant Examiner* — Devin Almeida
(74) *Attorney, Agent, or Firm* — Young & Thompson (57) ABSTRACT

A secure data processing method includes the following steps: padding (E206) a memory area (MAC') with a pad value (A); writing (E208) a first datum in the memory area (MAC'); in the area, reading (E210) a second datum with at least one part of the first datum as it was written in the memory area (MAC'); and executing an operation (E210) using the second datum.

15 Claims, 8 Drawing Sheets

(56) References Cited

OTHER PUBLICATIONS

Anonymous: "Conference Programme", Internet Article, 'Online! XP002303177 Retrieved From the Internet:, url:http://web.archive.org/web/20030313034,714/http://www.ruhr-ini-bochum.de/hgi/opening/workshop/programme.html> 'Retrieved on Oct. 29, 2004!, Comme Information Pour La Date De Publication De XP002303174.

* cited by examiner

SECURE DATA PROCESSING METHOD AND ASSOCIATED DEVICE

The present invention concerns a secure data processing method. The invention also concerns a device associated with this type of method.

In the field of secure information processing, data such as a cryptographic key or a certificate is frequently used during the execution of a secure algorithm the aim whereof is to protect access to certain protected functions.

If, by observing a physical magnitude or a result after fault generation, the value of that data can be deduced, the security of the operation is no longer assured.

These secure systems are therefore subject to fault generation attacks in which the attacker seeks to interfere with a data preparation step so that the data assumes a predictable value, for example the initialization value of the memory concerned. Failing specific measures, the security of the system is then no longer assured.

One example of such systems is a microcircuit card that receives for the execution of an operation not only a command code (instruction coded in accordance with a certain standard or language) but also a code authenticating the command code (Message Authentication Code (MAC)) that enables the microcircuit card to verify that the command is authorized.

In normal operation, the microcircuit card applies a cryptographic algorithm using a secret key to the command code in order to obtain the authentication code normally associated with that command and stores that authentication code in a buffer memory to compare it subsequently with the authentication code received by the card with the command message. A comparison of the code calculated in this way by the card and the received code will therefore enable verification that the user who supplied the received authentication code is indeed authorized to effect the operation concerned.

However, in known systems, if an attacker succeeds in interfering with the storage of the code calculated by the cryptographic algorithm so that the buffer memory is not modified and therefore remains at its initialization value (for example at the null value) he could easily force the execution of the protected operation by transmitting to the microcircuit card an authentication code equal to the initialization value, which will then enable a positive comparison between the code received and the calculated code, and thus the execution of the operation without real authorization.

In order to combat this type of attack in systems that use during a particularly sensitive operation an information item written into memory during a preceding step, the invention proposes a secure data processing method, characterized in that it comprises the following steps:
  filling an area of memory with a filling value;
  writing a first data item in this area;
  reading in this area a second data item repeating at least a portion of the first data item as written in this area;
  executing an operation using the second data item.

Naturally, in normal operation, the second data item identically reproduces the portion of the first data item. On the other hand, if this process is interfered with by a fault generated by an attacker and the writing of the first data item is not effected, the second data item is equal to at least a portion of the filling value, which differs from the initialization value of the memory and is unknown to the attacker, and consequently remains unpredictable by the attacker.

In order to improve further the security of the system, the filling value may be a random value. Here there is considered as a random value a value that is generated by a method that tends to render it unpredictable, such as the value generated in secure microcontrollers for microchip cards (thanks to resources, for example hardware resources, provided by the designer of the microcontroller), or more generally within electronic data processing systems; this type of value is sometimes called a "pseudo-random" value.

In order to improve security, there may also be provision for:
  the first data item to be independent of the random value;
  the execution of the operation to be independent of the random value.

If the operation using the second data item consists in verifying if the second data item verifies a predetermined criterion, the method comprises for example a step of execution of a protected operation in the event of positive verification. The use of the invention is particularly interesting in this situation.

According to a first possibility, the method comprises a step of calculation of the first data item.

In this case, in order to improve security, said memory area is unchanged up to the step of calculation of the first data item.

The calculation of the first data item comprises for example a step of application of a secret key cryptographic algorithm. This technique is particularly practical.

In one possible embodiment, the method comprises a step of comparing the second data item to an authentication code.

According to a second possibility, the method comprises a step of reading the first data item on an information medium.

In this case, in order to improve security, said memory area is unchanged up to the step of reading the first data item on the information medium.

The invention is particularly beneficial if the memory area is a volatile memory area. It applies to any type of memory, however.

In one particular application of the invention, the method comprises the following steps:
  receiving a command code and an authentication code;
  calculating the first data item by applying a secret key cryptographic algorithm to the command code;
  comparing the second data item to the authentication code;
  executing the operation corresponding to the command code if the comparison is positive.

Alternatively, the operation using the second data item is sending the second data item.

The invention therefore proposes a method of securing a protected operation, characterized in that it comprises the following steps:
  filling a memory area with a filling value;
  writing in this area a data item conditioning the future execution of the protected operation.

According to one practical embodiment, the method comprises a step of calculation of said execution-conditioning data item by means of a cryptographic algorithm.

Alternatively, the method comprises a step of reading said execution-conditioning data item on an information medium.

The invention also proposes a secure data processing device, characterized in that it comprises:
  means for filling a memory area with a filling value;
  means for writing a first data item in this area;
  means for reading in this area a second data item comprising at least a portion of the first data item as written in this area;
  means for executing an operation using the second data item.

The device may have features equivalent to the optional features of the method described above and therefore the advantages that follow from each of them.

Moreover, the device may be a microcircuit card.

Accordingly, the invention proposes a protected operation execution securing device, characterized in that it comprises:
- means for filling a memory area with a filling value;
- means for writing in this area a data item conditioning the future execution of the protected operation.

Finally, the invention proposes a computer program comprising instructions adapted to execute the method described above when said instructions are executed by a microprocessor.

Other features and advantages of the description will become apparent in the light of the following description, given with reference to the appended drawings, in which.

Figure 1A:
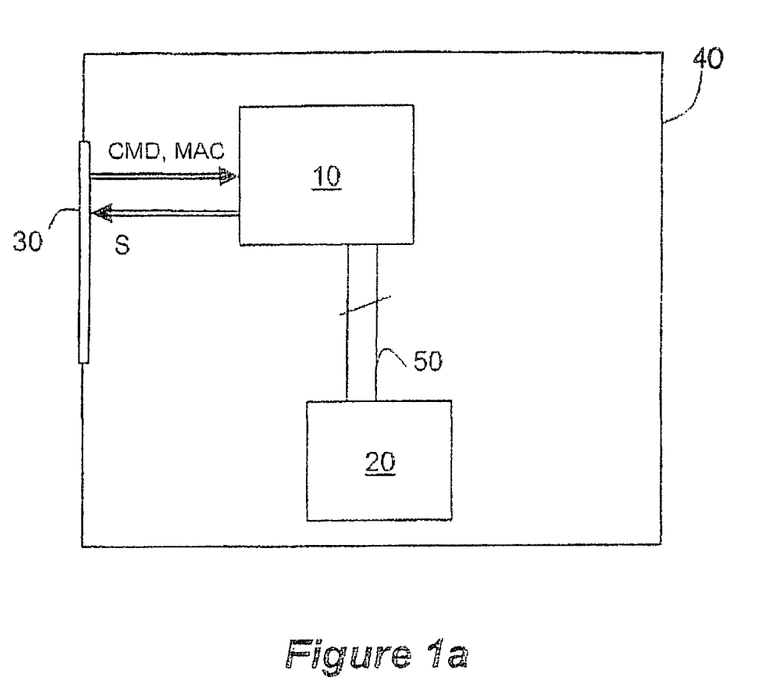
FIG. 1a represents diagrammatically a data processing device incorporating a first embodiment of the invention.

FIG. 1a represents diagrammatically a data processing device 40 in which the present invention is implemented. This device 40 comprises a microprocessor 10 with which a memory 20 may be associated, for example by means of a bus 50. The data processing device 40, and more precisely the microprocessor 10 that it incorporates, can exchange data with external devices by means of a communication interface 30.

There is diagrammatically represented in FIG. 1a the transmission of input data CMD and MAC received from an external device (not shown) and transmitted from the communication interface 30 to the microprocessor 10. In a similar manner, there is shown the transmission of an output data item S from the microprocessor 10 to the communication interface 30 to an external device. Although, for purposes of illustration, the input data CMD, MAC and the output data S are shown on two different arrows, the physical means enabling communication between the microprocessor 10 and the interface 30 could take the form of single means, for example a serial communication port or a bus.

The microprocessor 10 is adapted to execute software that enables the data processing device 40 to execute a method according to the invention, one example whereof will be given hereinafter. The software is composed of a series of command instructions for the microprocessor 10 that are stored in the memory 20, for example.

Alternatively, the combination of the microprocessor 10 and the memory 20 may be replaced by a specific application circuit that then comprises means for implementing the various steps of the securing method.

Figure 1B:
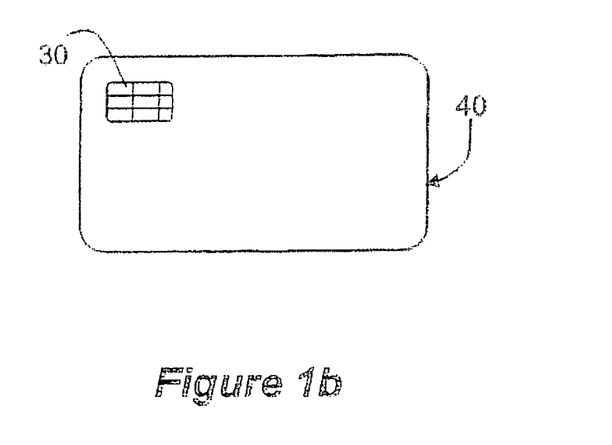
FIG. 1b represents one possible embodiment of the FIG. 1a device.

FIG. 1b represents a microcircuit card that constitutes a data processing device according to the invention as represented in FIG. 1a. The communication interface 30 in this case takes the form of the contacts of the microcircuit card.

The microcircuit card incorporates a microprocessor 10 and a memory 20 as shown in FIG. 1a.

Figure 2:
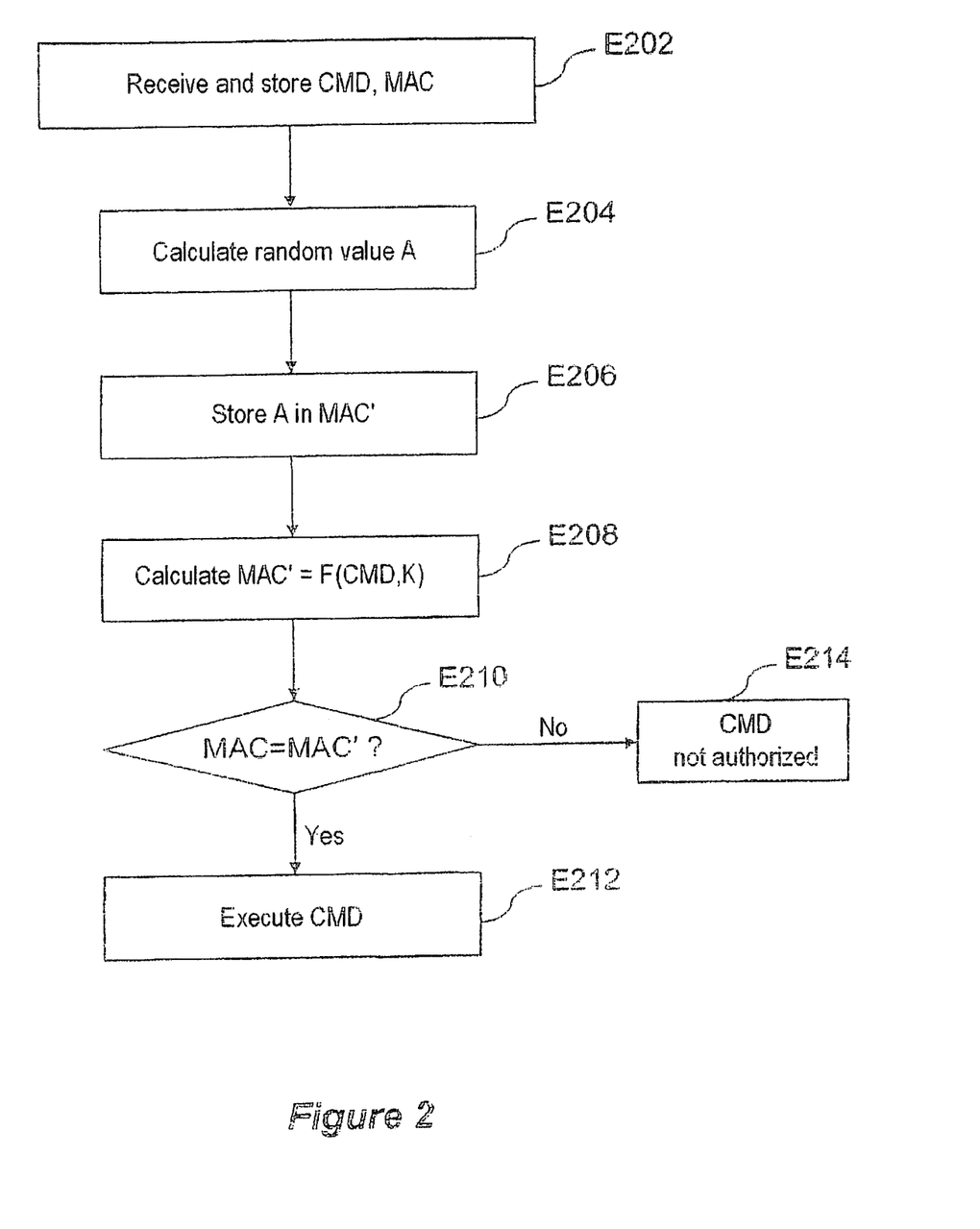
FIG. 2 shows a method according to the first embodiment of the invention in normal operation.

FIG. 2 represents in the form of a flowchart the steps of a first example of a securing method conforming to the invention.

The method is initiated by the reception of input data CMD and MAC by the microprocessor 10 by means of the communication interface 30. For example, this input data is received from an external device that wishes to effect a protected operation within the device 40.

The input data CMD defines a command code associated with the protected operation, i.e. it defines which operation the microprocessor 10 must execute. The input data item MAC is a message authentication code the validity whereof conditions the execution of the protected operation. The message authentication code MAC is generally obtained from the command code CMD by means of a secret key cryptographic algorithm and typically a hashing function such as MD5 or SHA-1.

The input data CMD and MAC is saved as soon as it is received, for example in the memory 20.

The reception and the memorization (or storage) of the input data CMD, MAC are represented in FIG. 2 by the step E202.

The subsequent steps enable verification that the authentication code MAC indeed corresponds to the command code CMD received and thus that the latter was sent by an authorized entity. This verification is secured against fault generation attacks as will more particularly emerge from the part of the description relating to FIG. 3.

Once the microprocessor 10 has received the input data CMD and MAC and saved it in the memory 20, it generates a random value A in the step E204.

The random value A is then saved in a buffer MAC' (sometimes called a buffer memory in English). More precisely, the microprocessor 210 commands the writing of the random value A into the buffer memory MAC'. The buffer memory MAC' (which is therefore a memory area, for example an area of the memory 20) is used afterwards to memorize a calculated authentication code, as described in detail hereinafter.

The steps E204 and E206 therefore enable initialization (i.e. in practice filling) of the buffer memory MAC' to (with) a random value A.

If the buffer memory MAC' is initialized with the random value A, the next step is then the step E208 in which there is calculated the authentication code of the message corresponding to the command code CMD received by means of a cryptographic algorithm F that uses a secret key K stored in the device 40, for example in the memory 20. A hashing algorithm is preferably used, typically an MD5 or SHA-1 algorithm. The result of the cryptographic calculation is then stored in the buffer memory MAC' where it replaces the initialization random value A. More precisely, the microprocessor 210 commands the writing of the result of the cryptographic calculation into the buffer memory MAC' provided for this purpose.

The steps E206 and E208 may be separated by other steps of the operation of the system; such separation also increases the security of the system because it is more difficult in this case to effect a fault generation attack on both steps.

Naturally, the cryptographic algorithm F and the secret key K used in the step E208 correspond to those used by the external device that is requesting execution of the secure operation to generate the input data item MAC. Accordingly, if the external device is authorized to request execution of the protected operation designated by the command code CMD, it is in possession of the secret key K and can therefore supply the valid authentication code MAC.

In this case, the calculated authentication code MAC' is equal to the received code MAC. Verification of this equality (step E210), which thus implies inter alia the reading of the buffer memory MAC', then enables passage to the step E212 in which the protected operation associated with the command code CMD is executed.

On the other hand, if the external device that supplied the input data CMD and MAC is not authorized to execute the protected operation associated with the command code CMD, it is generally not in a position to supply a correct authentication code MAC without knowing the secret key K. Without authorization to effect the protected operation (i.e. without a knowledge of the secret key K), the received authentication code MAC is therefore different from the calculated authentication code (read from the buffer memory MAC' in the step E210), which in turn is the result of applying the cryptographic algorithm F with a knowledge of the secret key K. Receiving an invalid MAC authentication code will therefore lead to the absence of verification of the equality MAC=MAC' in the step E210 and the method then continues to the step E214 in which the microprocessor 10 detects that the execution of the protected operation (defined by the command code CMD) is not authorized. The microprocessor 10 therefore does not carry out the protected operation in this case. The microprocessor 10 may additionally send an error message or command the blocking of the subsequent operation, depending on the applications.

Figure 3:
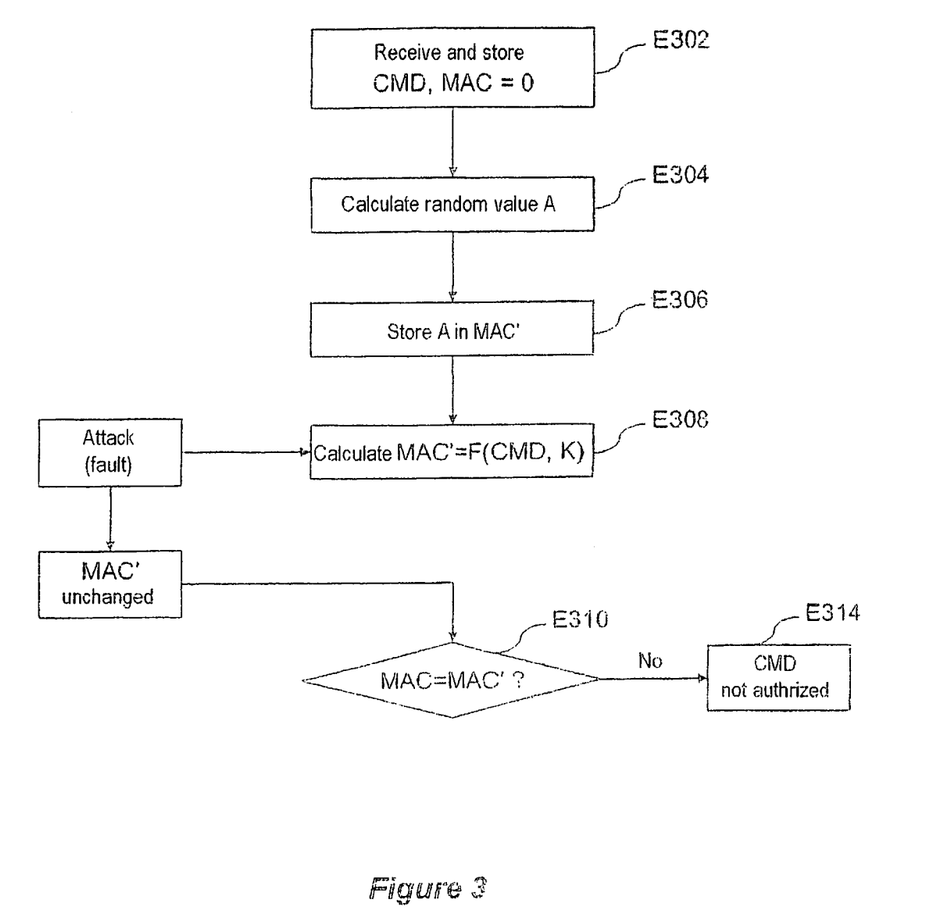
FIG. 3 illustrates the method according to this first embodiment when it is subject to a fault generation attack.

There will now be described with reference to FIG. 3 the steps of the method in the situation where an attacker attempts, by the generation of a fault, to circumvent the protection that has just been described, i.e. to execute the protected operation without necessitating the provision of the valid message authentication code.

In this type of attack, the device 40 receives in the step E302 a command code CMD that corresponds to a protected operation and a code for authenticating the invalid message MAC, for example of null value.

Once the input data CMD and MAC has been received, the microprocessor proceeds to the step E304 of calculating a random value A, as previously described for the step E204 in FIG. 2.

Similarly, the random value A is stored in a buffer memory MAC' in a step E306 identical to the step E206 of FIG. 2.

Continuing the normal operation described with reference to FIG. 2, the next step is the particularly sensitive operation of calculating the authentication code MAC' that corresponds to the command code CMD using the cryptographic algorithm F and the secret key K (step E308).

If a fault generation attack is applied when the step E308 is being executed in the microprocessor 10, there is a high probability that this step will not be carried out correctly and that the buffer memory MAC' will not be modified as it should be (see description relating to FIG. 2).

The objective of the attackers is naturally for the buffer memory to remain at its initialization value, which in the steps E304 and E306 would be the null value that is generally found in memories at the time of their initialization, for example before modification in the case of non-volatile memories and after reservation in the case of volatile memories. In fact, this will achieve equality between the invalid authentication code MAC received in the step E302 and the value memorized as being the authentication code calculated in the step E308, which would thus lead to the execution of the protected operation defined by the command code CMD with an invalid authentication code MAC.

On the other hand, the steps E304 and E306 for initializing the buffer memory MAC' fix the prior value of the buffer memory to a non-predictable value. Accordingly, at the time of the fault attack, even if the step E308 of calculating the authentication code linked to the command code CMD is interfered with and the buffer memory remains unchanged, the equality between the value read in the buffer memory MAC' and the received authentication code MAC will not be verified.

Thus the attacker cannot determine an authentication code MAC to use with his command such that MAC=MAC'.

The step of verification of the equality between the received authentication code and the calculated authentication code from the step E310 (previously described as step E210) will therefore lead to the step E314 in which the microprocessor 10 does not authorize the execution of the protected operation defined by the command code CMD, as previously described in the step E214.

Figure 4:
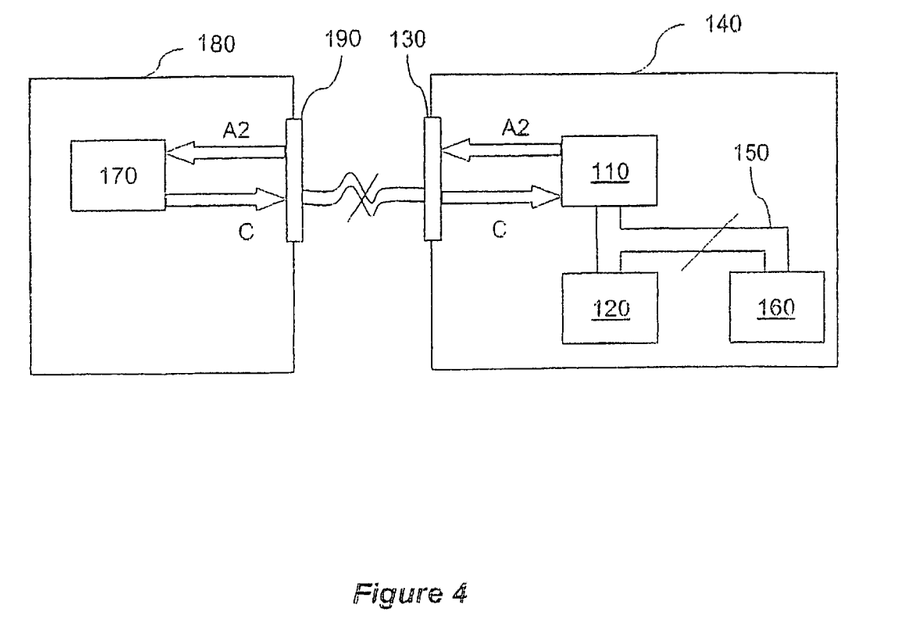
FIG. 4 represents diagrammatically devices involved in a second embodiment of the invention.

There is represented in FIG. 4 a second embodiment of a device 140 conforming to the teachings of the invention.

The device 140, for example a memory card, comprises a microprocessor 110 associated by means of a bus 150 on the one hand with a volatile memory 120 and on the other hand with a non-volatile memory 160. The volatile memory is for example a memory of the type denoted by the English acronym RAM (standing for "Random Access Memory"). The non-volatile memory 160 is for example of the erasable and electrically programmable type, generally denoted by the English acronym EEPROM (standing for "Electrically Erasable Programmable Read Only Memory") and/or of the ROM type (standing for "Read Only Memory").

The microprocessor 110 is adapted, for example by means of instructions stored in the non-volatile memory 160, to execute methods and in particular the method conforming to the invention described with reference to FIG. 5.

The device 140 communicates with an external device 180 by means of an interface 130. To this end, the external device 180 also has an interface 190 connected to the interface 130 of the device 140. Within the external device 180, a controller 170 (for example of the microprocessor or microcontroller type) is adapted to process the information received from the interface 190 and to transmit the processed information to the device 140 again by means of the interface 190.

There is represented diagrammatically in FIG. 4 the transfer of an information item A2 from the device 140 to the external device 180. To be precise, the information item A2 is generated within the microprocessor 110 and then sent by the latter via the interface 130. The information item A2 is thus communicated to the external device via the interface 130 of the device 140, then the interface 190 of the device 180, and because of this reaches the controller 170 as also represented in FIG. 4.

In accordance with the converse process, an information item C sent by the controller 170 can be transmitted to the microprocessor 110 via the interfaces 190 then 130 as represented in FIG. 4.

As already mentioned with reference to FIG. 1a, the links between microprocessor 110 and interface 130 and between controller 170 and interface 190 are diagrammatically represented by two different arrows, but may in practice use the same physical wiring.

Figure 5:
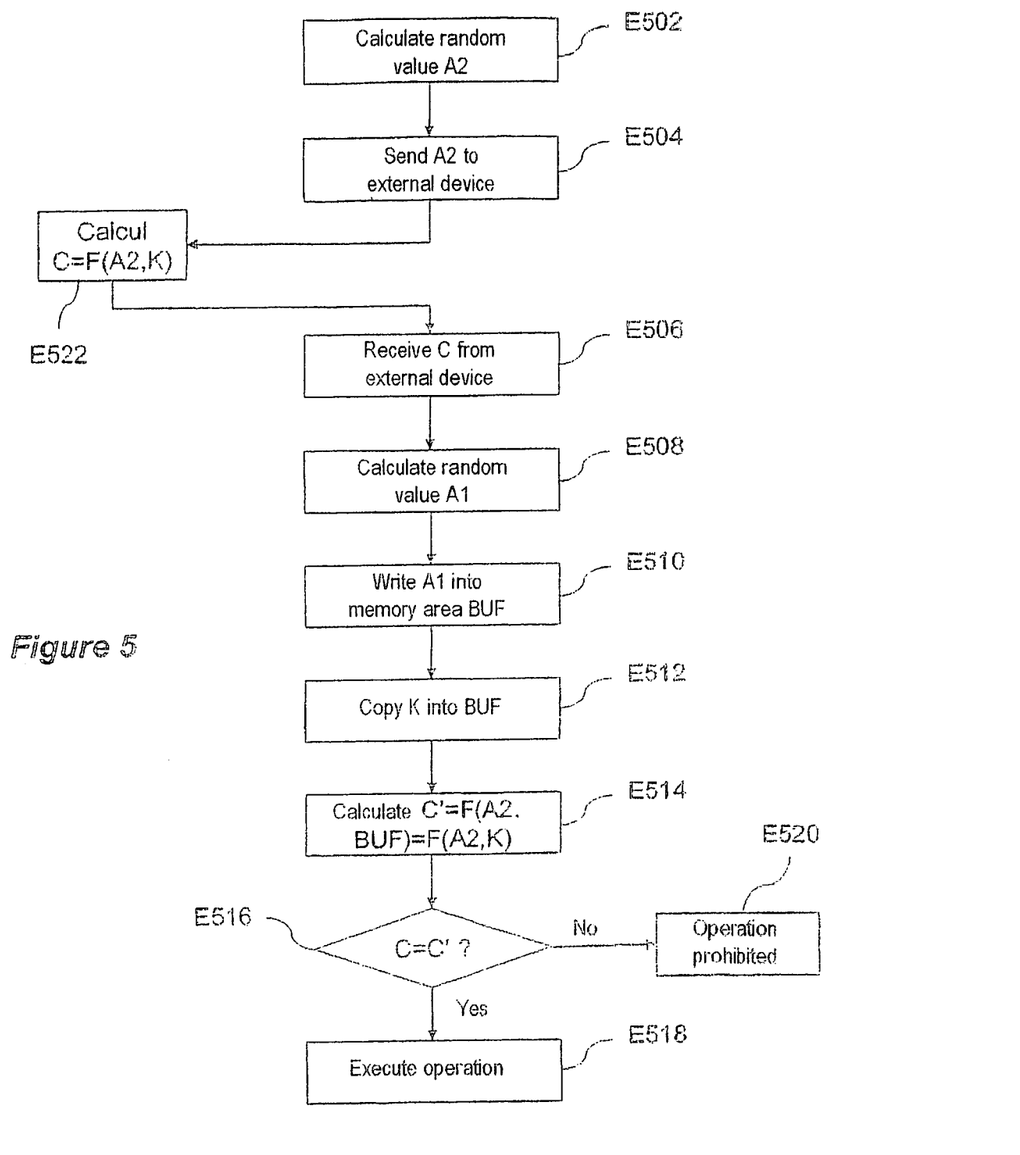
FIG. 5 illustrates a method according to the second embodiment of the invention in normal operation.

FIG. 5 represents a process of authentication of the external device 180 as the device authorized to command the execution of a protected operation in the device 140. To simplify the description, FIG. 5 is limited to the process of authentication of the external device 180 by the device 140 and does not refer to the previous steps by which the external device 180 effects a request to effect the protected operation.

The authentication process begins in the step E502 in which the microprocessor 110 generates a random value A2.

The random value A2 generated is then sent to the external device 180 during a step E504. This step naturally uses the interfaces 130 and 190 as described previously.

On receipt of the random value A2, the external device 180 proceeds to a step E522 of calculation of an encrypted data item C by application of a cryptographic algorithm F using a secret key K to the random value A2 received. This calculation is for example carried out in the controller 170. As will be seen hereinafter, this calculation ensures that the external device 180 has the secret key K (and thus the authorization to effect the protected operation), without this verification necessitating the transmission of the secret key K itself.

The encrypted data item C calculated by the external device 180 is then transmitted to the device 140 by means of the interfaces 190 and 130 as described with reference to FIG. 4.

The device 140, and more particularly its microprocessor 110, thus receive in the step E506 the encrypted data item C as calculated by the external device 180.

In the subsequent steps, the microprocessor 110 will verify that this encrypted data item C was indeed obtained by application of the cryptographic algorithm F knowing the secret key K. As will be described in detail, this verification is protected thanks to the invention against fault generation attacks.

To this end, the microprocessor 110 generates in the step E508 a new random value A1. The new random value A1 is preferably independent of the random value A2 that has been communicated to the outside of the device 140. By independent random values is meant random values neither of which can be predicted from the other.

The next step is then the step E510 in which the microprocessor 110 commands the writing of the random value A1 into an area BUF of the volatile memory 120, i.e. the filling of the area BUF with the random value A1. This type of memory area, which is used as will be seen hereinafter to effect certain calculations, is sometimes denoted by the English term "buffer", although the general translation of the French term is "buffer memory". A memory area of this kind is generally characterized by an address in the memory, which corresponds to a variable in certain programming languages.

At the end of the step E510, the memory area BUF is therefore initialized to the random value A1, i.e. to a value that cannot be predicted.

After the step E510, and where applicable other steps, the next step is the step E512 in which the secret key K stored in non-volatile memory 160 is copied into the memory area BUF of the volatile memory 120 in order to proceed to the subsequent calculations that use the secret key K.

If the secret key K is present in volatile memory 120, one may proceed to the step E514 of calculation by the microprocessor 110 of an encrypted data item C' by application of the cryptographic algorithm F with the secret key K to the random value A2. In practice, there is naturally used as the secret key the value present in the memory area BUF at the time of application of the cryptographic algorithm F. The step E514 therefore comprises a sub-step of reading the value stored in the area BUF.

In normal operation as described with reference to FIG. 5, the encrypted data item C' calculated by the microprocessor 110 knowing the secret key K gives an identical result to the same calculation effected by the external device 180 if the latter knows the secret key K. It is then clear that the verification of the equality between the encrypted data items C and C' ensures that the external device 180 is indeed in possession of the secret key K and because of this is authorized to request the execution of the protected operation by the device 140.

Consequently, if it is verified in the step E516 that the encrypted data items C and C' are equal, there is executed in the step E518 the protected operation requested by the external device 180 of the device 140, which may consist for example in personalization of the device 140 by copying certain data sent by the external device 180.

On the other hand, if it is determined in the step E516 that the encrypted data item received from the external device 180 is not equal to the encrypted data item C' calculated in the step E514, this means that the external device 180 was not in a position to effect the cryptographic algorithm F with the secret key K, and that the external device 180 is therefore not authorized to carry out the protected operation. Thus in this case the next step is the step E520 in which the protected operation will not be effected.

Note that using the random value A2, which is inherently unpredictable, to which the external device 180 must apply the cryptographic algorithm F with the secret key K verifies that the external device does know the secret key K without necessitating the transfer of the secret key K itself, which would greatly compromise the security of this kind of system.

There will next be described with reference to FIG. 6 the operation of the FIG. 5 method in the situation where a fault generation attack is generated by an attacker.

It is assumed in this case that the external device 180 is in fact an attacker that is requesting the execution of the protected operation by the device 140 without being authorized to do so, i.e. without knowing the secret key K.

The authentication process commences in the step E602 with the calculation of the random value A2 as already described in the step E502.

The random value A2 is then sent to the external device 180 (here the attacker) in a step E604 equivalent to the step E504 in FIG. 5.

The attacking device receives the random value A2 but naturally cannot execute the cryptographic algorithm using the secret key K, since it does not know the latter. The attacking device will therefore in a step E622 apply the cryptographic algorithm F to the value A2 using a predetermined value I as the secret key, which value corresponds for example to the current initialization value of the volatile memories (generally the null value, in certain cases the hexadecimal value FF). As we shall see, the attacker in fact hopes to generate a fault during the verification process effected by the microprocessor 110 so that the verification takes place with this same value I instead of the secret key K.

The encrypted data item C calculated by the attacker using the value I is then sent to the device 140 as is normal in the authentication process. In the step E606, the encrypted data item C is therefore received by the microprocessor 110.

As previously, the area BUF of the volatile memory 120 is initialized with a random value A1, which is therefore unpredictable. To this end, the microprocessor 110 generates the random value A1 in the step E608 and writes that random value A1 into the memory area BUF in the step E610.

The authentication process must then continue with the step E612 of copying the secret key K stored in the non-volatile memory 160 into the memory area BUF. The step E612 is however the subject of a fault generation attack, as the attacker wishes to have the cryptographic algorithm executed with a value to which it has access, for example the initialization value I of the volatile memory.

Figure 6:
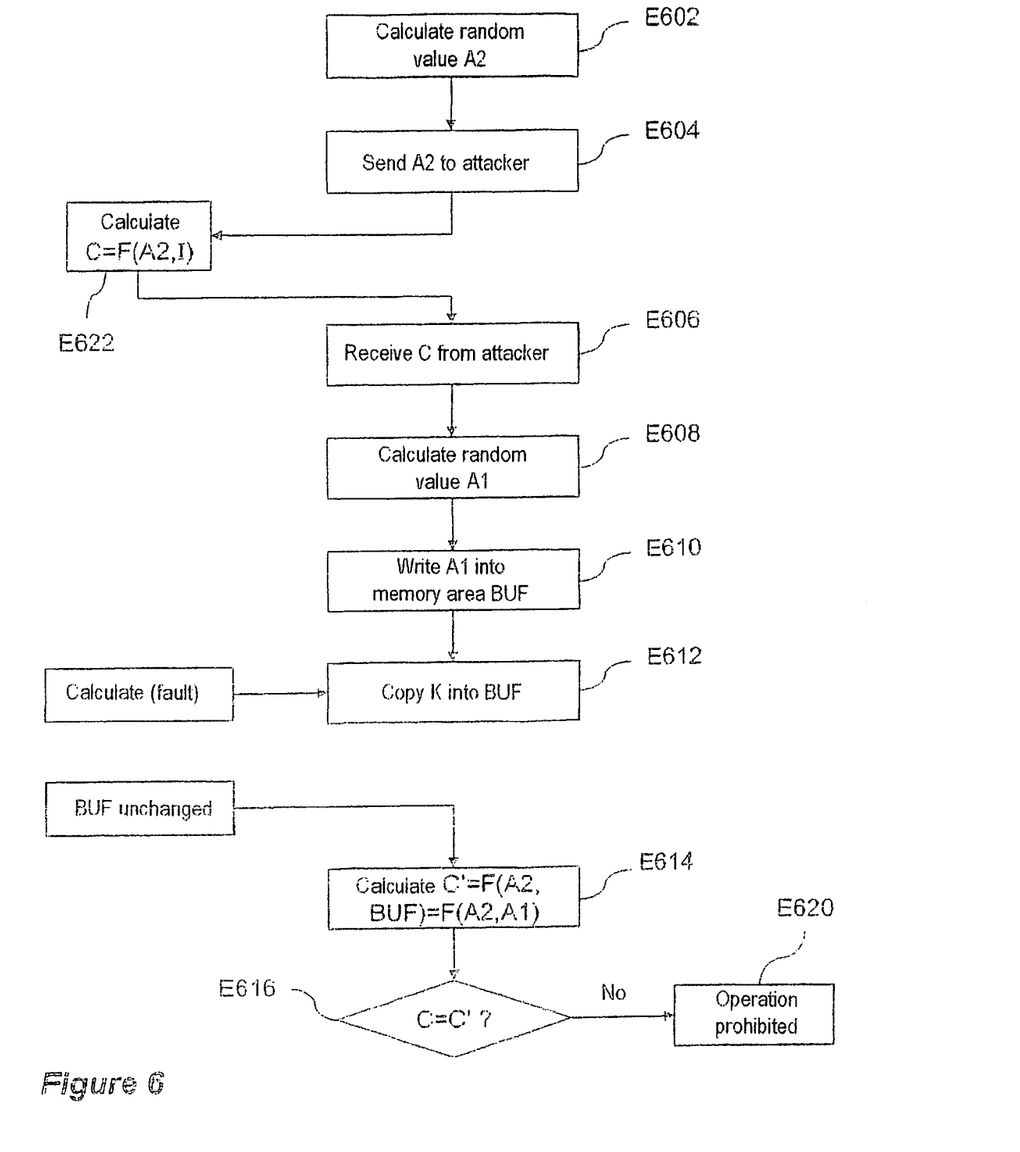
FIG. 6 illustrates a method according to the second embodiment of the invention when it is subjected to a fault generation attack.

As represented in FIG. 6, the result of the attack in the step E612, which is therefore not executed normally, is that the memory area BUF in which the secret key K should be written is unchanged.

Once the attack has passed, the authentication process resumes its normal course, i.e. the step E614 of calculating the encrypted data item C'. As we have seen, this step, which in theory applies the cryptographic algorithm F using the secret key K to the random value A2, consists in practice of reading the content of the memory area BUF and applying the cryptographic algorithm F using the value read in the memory BUF as the secret key.

In the present case, thanks to the initialization of the memory area BUF to the unpredictable random value A1, the calculation effected is in fact the application to the random value A2 of the cryptographic algorithm F with the random value A1 as the secret key. The result (i.e. the encrypted data item) C' of this step E614 is therefore highly unpredictable, and in the very general case will not be equal to the encrypted data item C calculated in the external device 180.

Consequently, during the step E616 of verification of the equality of the encrypted data items C and C' (equivalent to the step E516 of FIG. 5), the equality will not be verified and the protected operation will therefore be prohibited, as represented in the step E620.

It is seen that, thanks to the initialization of the memory area BUF with the random value A1, the fault generation attack leads to using the random value A1 instead of the secret key K, which maintains the impossibility of fraudulently obtaining the authorization to effect the protected operation.

Note that the steps E508 and E510 (or the step E508 alone) could be situated elsewhere within the algorithm, for example before the step E502 or immediately after the step E504, without however compromising the advantages procured by the invention.

Figure 7:
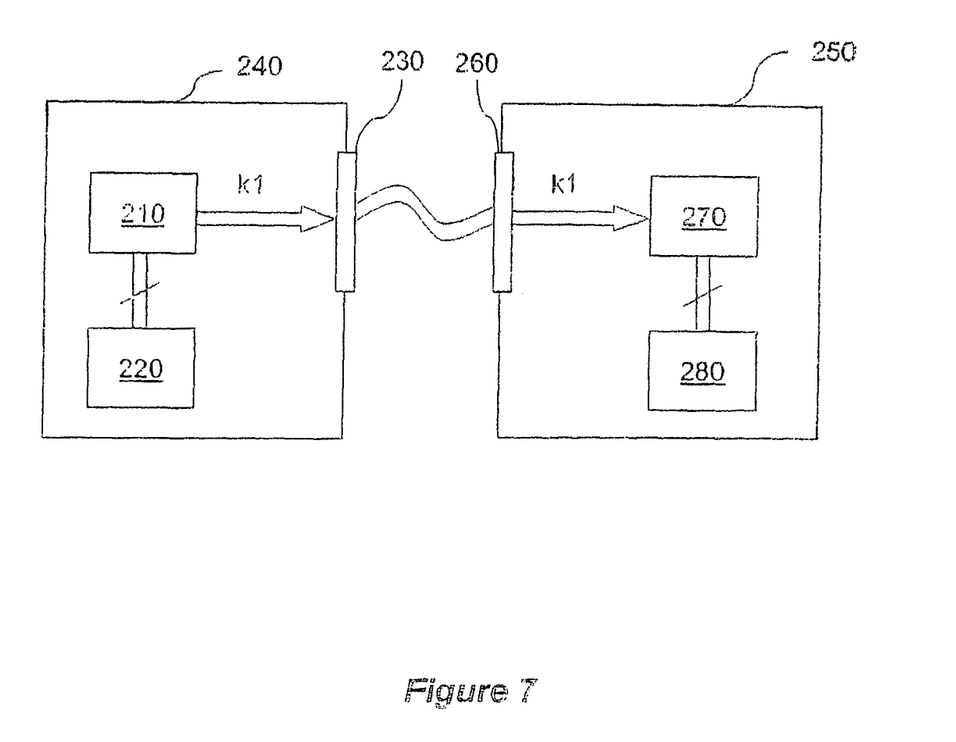
FIG. 7 represents diagrammatically devices involved in a third embodiment of the invention.

There is represented in FIG. 7 a third embodiment of the invention.

A device 240 comprises a microprocessor 210 connected to a memory 220 by means of a bus, together with an interface 230 that enables the microprocessor 210 to enter into connection with an external device, for example a microcircuit card 250.

The microcircuit card 250 also comprises a microprocessor 270 connected to a memory 280 through the intermediary of a bus. An interface 260 of the microcircuit card 250 enables the microprocessor 270 to enter into connection with external devices such as the device 240 previously described.

Figure 8:
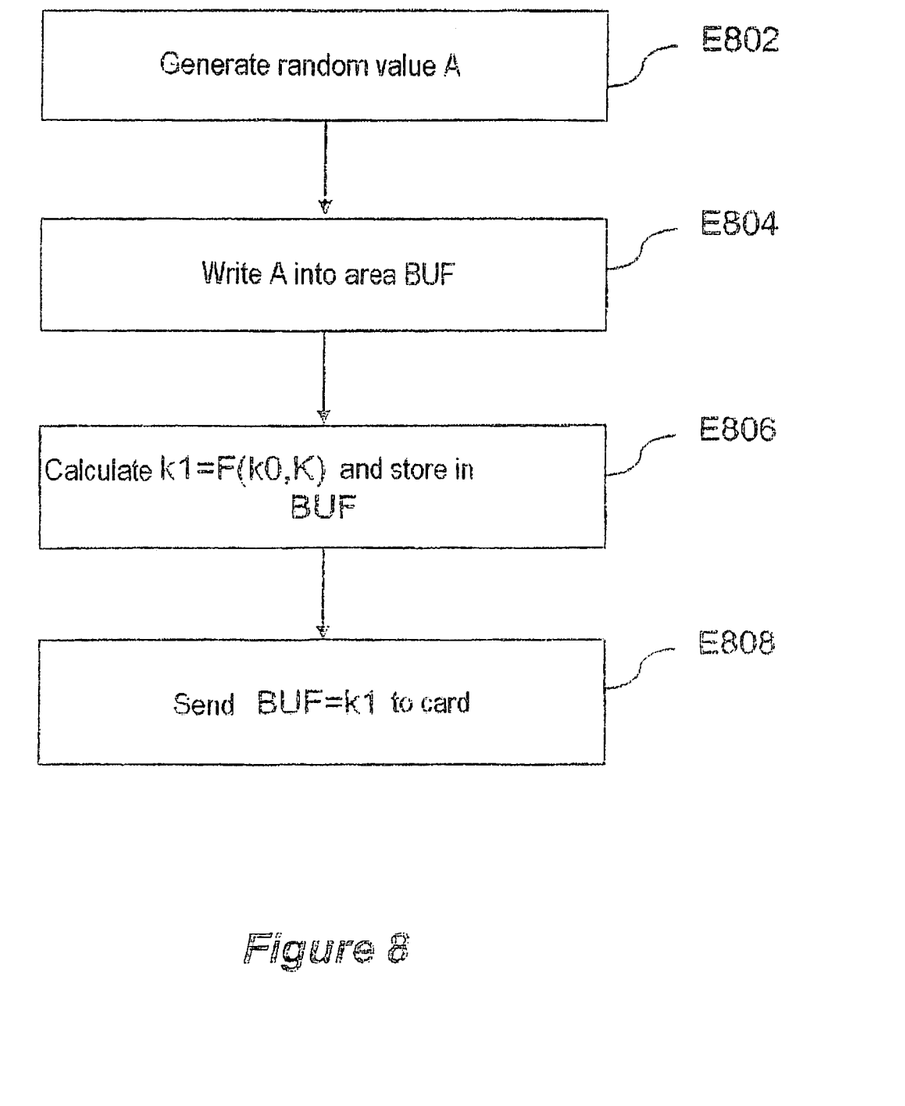
FIG. 8 illustrates a method according to the third embodiment of the invention in normal operation.

FIG. 8 represents in the form of a flowchart a method conforming to the teachings of the invention and implemented by the device 240.

This method stores in the memory card 250 an individual secret key k1 that is generated by a secure method from a secret key K stored in the device 240, for example in this case a root card (also known as a batch card). The transaction is controlled by a computer that is not shown.

The method conforming to the invention commences with a step E802 in which the microprocessor 210 generates a random value A.

In a step E804, the random value A is memorized in an area BUF of the memory 220 intended to store the individual key k1 to be memorized in the card 250.

Once the random value A is written in the memory area BUF, it may be considered that the memory area BUF is initialized with an unpredictable value A.

The next step is then the step E806 in which the individual key k1 is calculated with the aid of a cryptographic algorithm F using the secret key K. The input data item k0 of the cryptographic algorithm is for example an individual key generated previously. The calculation uses the memory area BUF, inter alia to store its result k1.

The method then continues with the step E808 of sending the individual key k1 that has just been calculated to the memory card 250. More precisely, the microprocessor 210 reads the value from the memory area BUF and transmits it by means of the interface 230 to the memory card 250.

Note that, in a similar manner to what has been explained for the first and second embodiments, the initialization of the memory area BUF with an unpredictable value A renders ineffective any fault generation attack on the step of cryptographic calculation (here the cryptographic calculation step E806 that memorizes the result in the memory area BUF). In fact, even if an attacker attempts to prevent the correct execution of the calculation of the individual key k1 in order to obtain a memory card 250 with a predictable individual key, its attack is ineffective since the memory card 250 finally contains the initialization value of the memory area BUF, i.e. the unpredictable random number A.

In the embodiments proposed hereinabove, and generally, the random value A, A1 could be replaced by a deterministic value not known to the attacker and thereby combat attacks. For example, it may be the current value of the authentication counter like that used in SIM (Subscriber Identity Module) cards to limit the total number of authentications effected by a card during its life.

The invention claimed is:

1. A secure data processing method that is executed by a microcircuit card and a host external to the microcircuit card, comprising:
   in the microcircuit card, filling an area of a volatile memory with a filling value;
   in the microcircuit card, reading a first data item from a non-volatile memory;
   in the microcircuit card, transmitting the first data item to a host device;
   in the microcircuit card, writing the first data item into said area of the volatile memory to replace said filling value;
   in the microcircuit card, reading from said area of the volatile memory a second data item that repeats at least a portion of the first data item as written in said area;
   in the microcircuit card, executing an operation using the second data item to produce a second data item;
   in the host, executing an operation using the
   first data item received from the microcircuit card to produce a third data item;
   in the microcircuit card, receiving the third data item from the host device; and
   in the microcircuit card, comparing the second data item to the third data item; and
   in the microcircuit card, executing a protected operation if and only if the comparing step determines a positive match between the second data item and the third data item.

2. The method according to claim 1, wherein the filling value is a random value.

3. The method according to claim 2, wherein the first data item is independent of the random value.

4. The method according to claim 1, wherein the execution of the operation is independent of a random value.

5. The method according to claim 1, further comprising:
   a step of calculating the first data item.

6. The method according to claim 5, wherein said memory area is unchanged up to the step of calculating the first data item.

7. The method according to claim 5, wherein the calculating the first data item comprises a step of applying a secret key cryptographic algorithm.

8. A method of securing a protected operation of a first device, said first device being a microcircuit device and configured for communication with a second device external to the first device, comprising:
- in the first device, transmitting a data item to the second device;
- in the first device, filling an area of volatile memory with a filling value;
- in the first device, reading a first data item from a non-volatile memory;
- in the first device, writing into said area of the volatile memory the first data item, thus replacing said filling value and conditioning a future execution of the protected operation;
- in the first device, reading from said area of the volatile memory a second data item that repeats at least a portion of the first data item as written in said area;
- in the first device, executing an operation using the second data item to produce a second data item;
- in the second device, executing an operation using the first data item received from the first device to produce a third data item;
- in the first device, receiving the third data item from the second device; and
- in the first device, comparing the second data item to the third data item; and
- in the first device, executing a protected operation if and only if the comparing step determines a positive match between the second data item and the third data item.

9. The method according to claim 8, further comprising: calculating said first data item by means of a cryptographic algorithm.

10. The method according to claim 8, further comprising: reading said first data item from an information medium.

11. A secure data processing device, comprising:
- a microprocessor programmed to perform, via implementation in a microcircuit card each of the steps of:
    - filling an area of volatile memory with a filling value;
    - reading a first data item from a non-volatile memory;
    - transmitting the first data item to a host device;
    - writing the first data item into said area such to replace said filling value in said area;
    - reading in said area a second data item comprising at least a portion of the first data item as written in said area;
    - receiving a third data item from the host device, said third data item being the result of an operation performed on the first data item that was received from the microcircuit card;
    - comparing the second data item to the third data item; and
    - executing an operation using the second data item if and only if the comparing step determines a positive match between the second data item and the third data item.

12. The device according to claim 11, wherein the filling value is a random value.

13. A protected operation execution securing device, comprising:
- a microprocessor programmed to perform, via implementation in a microcircuit card each of the steps of:
    - filling an area of volatile memory with a filling value;
    - reading a first data item from a non-volatile memory;
    - transmitting the first data item to a host device;
    - writing in said area the first data item, thereby replacing said filling value in said area for conditioning a future execution of the protected operation;
    - reading in said area a second data item comprising at least a portion of the first data item as written in said area;
    - receiving a third data item from the host device, said third data item being the result of an operation performed on the first data item received by the host device from the microcircuit card;
    - comparing the second data item to the third data item.

14. A non-transitory computer readable storage medium with a computer program stored thereon, comprising instructions adapted to execute the method according to claim 1 upon said instructions being executed by a microprocessor of the microcircuit card.

15. The method according to claim 1, wherein said area of the volatile memory is unchanged up to the step of reading the first data item from the non-volatile memory.

* * * * *